US012045671B2

(12) United States Patent
Hebbache et al.

(10) Patent No.: US 12,045,671 B2
(45) Date of Patent: Jul. 23, 2024

(54) TIME-DIVISION MULTIPLEXING METHOD AND CIRCUIT FOR ARBITRATING CONCURRENT ACCESS TO A COMPUTER RESOURCE BASED ON A PROCESSING SLACK ASSOCIATED WITH A CRITICAL PROGRAM

(71) Applicants: COMMISSARIAT A L'ENERGIE ATOMIQUE ET AUX ENERGIES ALTERNATIVES, Paris (FR); INSTITUT MINES-TELECOM, Palaiseau (FR)

(72) Inventors: Farouk Hebbache, Palaiseau (FR); Mathieu Jan, Paris (FR); Florian Brandner, Palaiseau (FR); Laurent Pautet, Palaiseau (FR)

(73) Assignees: COMMISSARIAT A L'ENERGIE ATOMIQUE ET AUX ENERGIES ALTERNATIVES, Paris (FR); INSTITUT MINES-TELECOM, Palaiseau (FR)

( * ) Notice: Subject to any disclaimer, the term of this patent is extended or adjusted under 35 U.S.C. 154(b) by 362 days.

(21) Appl. No.: 17/289,270

(22) PCT Filed: Oct. 22, 2019

(86) PCT No.: PCT/FR2019/052513
§ 371 (c)(1),
(2) Date: Apr. 28, 2021

(87) PCT Pub. No.: WO2020/089542
PCT Pub. Date: May 7, 2020

(65) Prior Publication Data
US 2021/0397488 A1   Dec. 23, 2021

(30) Foreign Application Priority Data
Oct. 31, 2018   (FR) ..................... 18 60117

(51) Int. Cl.
*G06F 9/52* (2006.01)
*G06F 9/50* (2006.01)

(52) U.S. Cl.
CPC ............ *G06F 9/526* (2013.01); *G06F 9/5005* (2013.01)

(58) Field of Classification Search
CPC .. G06F 13/1605; G06F 13/36; G06F 13/3625; G06F 13/368; G06F 13/372;
(Continued)

(56) References Cited

U.S. PATENT DOCUMENTS 6,061,361 A    5/2000  An et al.
7,603,503 B1 * 10/2009 Hutsell ................ G06F 13/364
                                                     710/241
(Continued)

FOREIGN PATENT DOCUMENTS

EP    0 886 218 A2   12/1998
EP    1 550 953 A1    7/2005

OTHER PUBLICATIONS

International Search Report issued Feb. 5, 2020 in PCT/FR2019/052513 filed Oct. 22, 2019, 3 pages.
(Continued)

*Primary Examiner* — Raymond N Phan
(74) *Attorney, Agent, or Firm* — Oblon, McClelland, Maier & Neustadt, L.L.P.

(57) ABSTRACT

The invention relates to a method implemented by computer for arbitration between computer programs seeking to access a shared resource concurrently and each transmitting an access request. The method performs time-division multiple access according to which the time is divided into time slots, each of which is allocated to a critical program for access to the shared resource, each time slot comprising a plurality of time units. The method exploits a processing slack associ-
(Continued)

ated with each critical program in order to delay a processing deadline for an access request transmitted by the critical program. The method comprises, for each unit time, a step of selecting a waiting access request and a step of determining authorization for immediate processing of the selected access request. This determining operation comprises, for a unit time which does not correspond to the beginning of a time slot, when the critical program to which the next time slot is allocated has not issued the selected request, authorization for the immediate processing of the selected request if the processing slack of the critical program to which the next time slot is allocated is greater than a threshold.

10 Claims, 4 Drawing Sheets

(58) Field of Classification Search
CPC ...... G06F 13/14; G06F 13/364; G06F 9/5005; G06F 9/52; G06F 9/526; G05B 2219/15099
See application file for complete search history.

(56) References Cited

U.S. PATENT DOCUMENTS

| | | | |
|---|---|---|---|
| 2009/0217280 | A1 | 8/2009 | Miller et al. |
| 2011/0093857 | A1* | 4/2011 | Sydow .................. G06F 9/3851 718/100 |
| 2014/0223114 | A1 | 8/2014 | Wang et al. |
| 2016/0283272 | A1* | 9/2016 | Coleman ............... G06F 9/5016 |
| 2019/0294472 | A1* | 9/2019 | Varadarajan .......... G06F 9/5011 |
| 2019/0370070 | A1* | 12/2019 | Houlbert ................... G06F 9/52 |
| 2019/0371840 | A1* | 12/2019 | Hirase .................... H10K 39/32 |

OTHER PUBLICATIONS

Preliminary French Search Report issued Jun. 27, 2019 in French Patent Application No. 1860117 filed Oct. 31, 2018, 2 pages (with Translation of Category).

* cited by examiner

TIME-DIVISION MULTIPLEXING METHOD AND CIRCUIT FOR ARBITRATING CONCURRENT ACCESS TO A COMPUTER RESOURCE BASED ON A PROCESSING SLACK ASSOCIATED WITH A CRITICAL PROGRAM

TECHNICAL FIELD

The field of the invention is that of real-time computer systems for which the execution time of tasks, and especially the worst-case execution time (WCET), has to be known in order to ensure their validation and guarantee their security. The invention more particularly aims at improving the utilisation ratio of a shared resource by computer programs executing in parallel while guaranteeing the estimation of the WCET of these programs by means of a time-division multiplexing arbitration policy for access to the shared resource.

STATE OF PRIOR ART

Real-time systems have to react reliably, which means both being certain of the result produced by their programs but also knowing the time they take to execute. Worst-case execution times are thus fundamental data for the validation and security of such real-time systems, and even more so within the context of autonomous real-time systems (robotics, autonomous cars, GPS) for which operational security is paramount.

However, calculating a WCET that is both guaranteed (strict upper bound) and not too pessimistic in order to reduce costs and complexity of such real-time systems is a difficult problem to solve on multi-core hardware architectures due to the competition between the different programs executing in parallel for access to shared resources, typically a shared memory. For each access request to such a shared resource issued by a program, the most unfavourable situation induced by the arbitration policy used to manage access to this shared resource should systematically be considered. This leads to a large pessimism in the value of the WCET obtained and therefore to a low utilisation ratio of this shared resource upon executing the program. This problem of under-utilisation of the shared resource is amplified with the multiplication of programs not subjected to time constraints (so-called non-critical programs) that execute in parallel with real-time programs (so-called critical programs). The access requests generated by these non-critical programs impact on the most unfavourable situation to has to be considered for access requests issued by the critical programs and thus enhance the pessimism of the calculated WCETs and under-utilisation of the shared resource.

It is possible to eliminate by construction any competition between access requests issued by the different programs by resorting to a Time-Division Multiplexing (TDM) arbitration policy. Under this policy, time is divided into time slots, each of which is allocated to a predefined program for exclusive access to the shared resource. The access time to the shared resource by a program can then be easily bounded (it corresponds to the maximum delay until reaching the next time slot allocated to the program), the bandwidth offered to a program is independent of the other programs and the WCETs of the programs can thus be determined.

However, access time to the shared resource by a program depends on the scheduling of the time slots allocated thereto. Yet, this scheduling is generally static, as it is performed upon designing the system, before the programs are executed. It generally comprises assigning a sequence of time slots to different programs, this sequence being repeated periodically (known as a TDM period). But the time slots of a TDM period are only used by the programs if they have an access request to the shared resource to be issued. When this is not the case, these time slots are therefore unused. A basic TDM arbitration policy is therefore said to be idle because these time slots are not recovered by the other programs in order to decrease their access time to the shared resource.

Besides, it is accepted that for real-time programs, there can be a factor of 10 on average between the execution time of a program instance and its WCET. The idleness of the TDM arbitration policy associated with this characteristic of real-time programs generates a low utilisation ratio of the shared resource. This problem is amplified when the number of programs increases, as in this case the length of a TDM period is also increased. Another factor amplifying this phenomenon is the presence within the systems under consideration of an increasing number of non-critical programs for which the assignment of slots increases the latency of the requests of the critical programs as well as the latency of the requests of these non-critical programs, in contradiction with their objective to have the best execution performance on average.

The publication by Farouk Hebbache, Mathieu Jan, Florian Brandner and Laurent Pautet, entitled "Dynamic Arbitration of Memory Requests with TDM-like Guarantees", Proceedings of the CRTS 2017 workshop, sets forth an improvement to such a TDM arbitration policy that allows its idleness to be reduced. According to this improvement, called TMDds ("dynamic TDM with slack counters"), a processing deadline is associated with each access request of a critical program that corresponds to the time instant at which processing of this request has to be terminated at the latest, which makes it possible to determine WCETs. This deadline simply corresponds to the end of the next time slot allocated to the critical program following issuing the access request.

Arbitration can then be made dynamic, as long as the processing deadlines are respected. To do this, a slack counter is associated with each critical program. This counter indicates the number of time slots between the actual termination of processing of an access request and its processing deadline. This counter is used to delay the processing deadline of the next access request of the critical program, if necessary. The arbitration performed at each beginning of time slot then consists in selecting the pending access request with the closest processing deadline, independently of the critical program to which this time slot is allocated.

Although this TDMds arbitration policy improves the use of the shared resource, it can still be improved. Indeed, for the systems under consideration, the length of the time slots has to be greater than or equal to the maximum time taken by a request, issued individually, to be processed by the shared resource. Yet if, for example, the shared resource is a memory, the access time of a write request is less than the access time of a read request, since in this second case the memory has to issue the requested data to the requesting program. Besides, the access time to a memory may depend on the history of requests issued by other programs. An upper bound for processing of requests therefore has to be identified to determine the length of the time slots. However, processing most requests will by definition terminate before this bound, so the TDMds arbitration policy remains idle.

DISCLOSURE OF THE INVENTION

The purpose of the invention is to provide an improved arbitration policy that optimises the use of the shared resource while guaranteeing time predictability of processing of access requests to the shared resource from critical programs.

To this end, the invention provides a computer-implemented method for arbitrating between computer programs attempting to concurrently access a shared resource by each issuing an access request. The method performs time-division multiple access whereby time is divided into time slots each allocated to a critical program for access to the shared resource, each time slot comprising a plurality of time units. A processing slack is associated with each critical program to delay a processing deadline of an access request issued by the critical program. The method comprises, at each time unit, a step of selecting an access request from one or more waiting access requests and a step of determining an authorisation for immediate processing of the selected access request. The determination step comprises, for a time unit not corresponding to the beginning of a time slot, when the critical program to which the next time slot is allocated has not issued the selected request, authorising immediate processing of the selected request if the processing slack of the critical program to which the next time slot is allocated is greater than a threshold.

Some preferred but not limiting aspects of the method are as follows:
- the determination step comprises, for a time unit not corresponding to the beginning of a time slot, when the critical program to which the next time slot is allocated has not issued the selected request and when the processing slack of the critical program to which the next time slot is allocated is less than the threshold, putting the selected request in a wait state;
- the threshold corresponds to the time difference between the time unit at which the determination step is performed and the time unit corresponding to the beginning of the next time slot;
- the determination step comprises, for a time unit not corresponding to the beginning of a time slot, when the critical program to which the next time slot is allocated has issued the selected request, authorising immediate processing of the selected request;
- the determination step comprises, for a time unit corresponding to the beginning of a time slot, authorising immediate processing of the selected request;
- the selection step comprises, in the presence of a waiting access request of a critical program and a waiting access request of a non-critical program, selecting the access request of the non-critical program if the processing deadline of the access request of the critical program is subsequent to the end of the next time slot;
- the processing slack of a critical program is updated at each termination of processing of an access request of the critical program to correspond to the number of time units between the termination of processing of the access request and the processing deadline of the access request;
- the processing deadline of an access request of a critical program corresponds to the end of a time slot allocated to the critical program which is the first to begin after a date corresponding to an issue date of the access request delayed by adding the processing slack of the critical program;
- it further comprises pre-empting, for the benefit of a critical program, a first program that issued an access request to the shared resource awaiting processing, said pre-emption comprising calculating a processing deadline of said request corresponding to the end of a time slot allocated to the critical program.

BRIEF DESCRIPTION OF THE DRAWINGS

Further aspects, purposes, advantages and characteristics of the invention will become clearer upon reading the following detailed description of preferred embodiments thereof, given by way of non-limiting example, and made with reference to the appended drawings in which.

DETAILED DISCLOSURE OF PARTICULAR EMBODIMENTS

Figure 4:
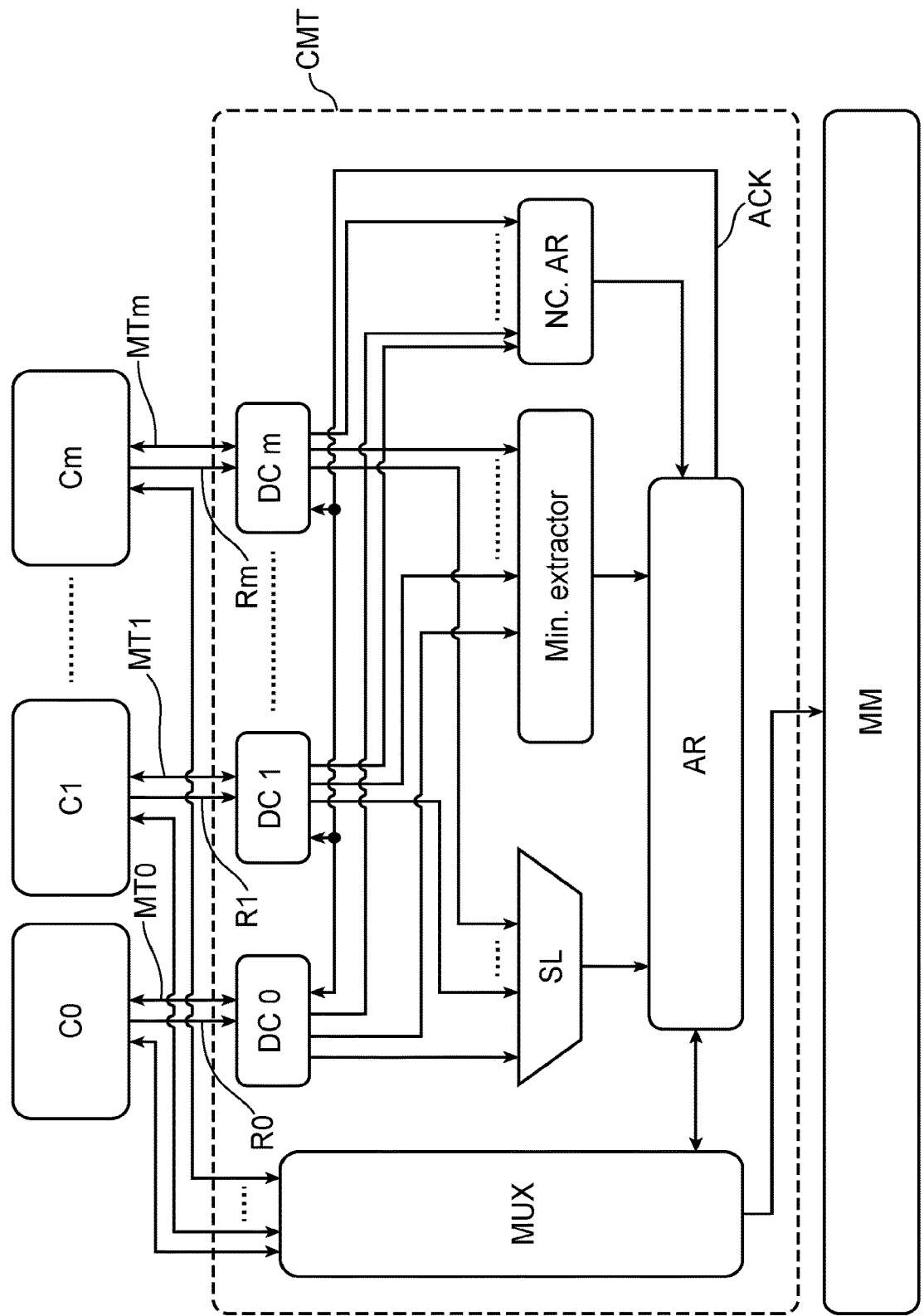
FIG. 4 is a schematic diagram of a circuit configured to implement the method according to the invention.

The invention relates to a computer-implemented method for arbitrating between computer programs attempting to concurrently access a shared resource by each issuing an access request. With reference to FIG. 4, which will be described in more detail subsequently, this method is typically implemented on a multi-core hardware architecture where each core C0, C1, Cm is configured to execute a program likely to require access to the shared resource during its execution. Each core may have a private cache memory and the shared resource is for example a shared memory MM. A hardware implementation configured to implement this method takes the form of a time-division multiplexing circuit CMT interposed between the cores and the shared resource.

Figure 1A:
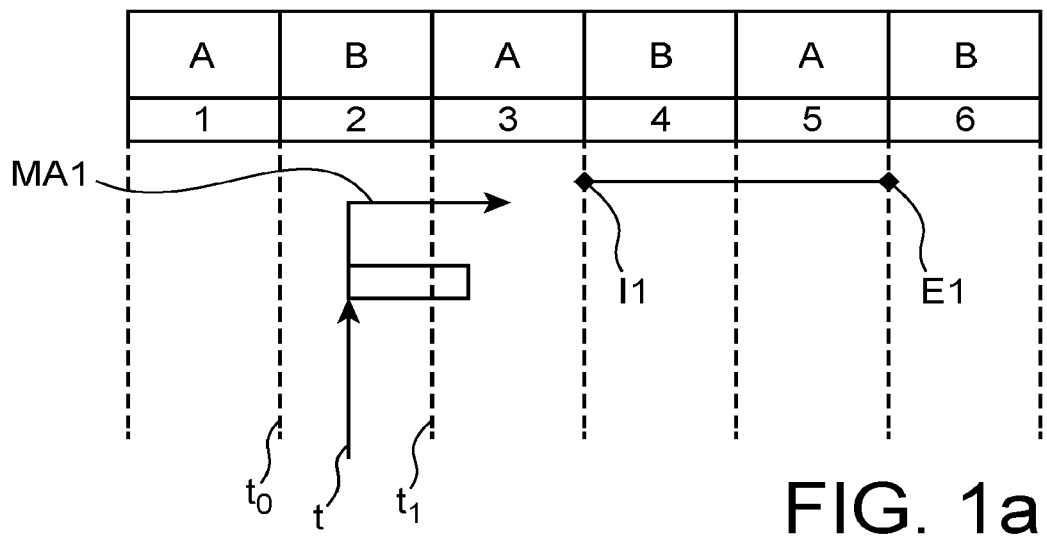
FIGS. 1a and 1b are schematic diagrams illustrating the principle of arbitration performed in the invention to authorise or not immediate access to the shared resource.
Figure 1B:
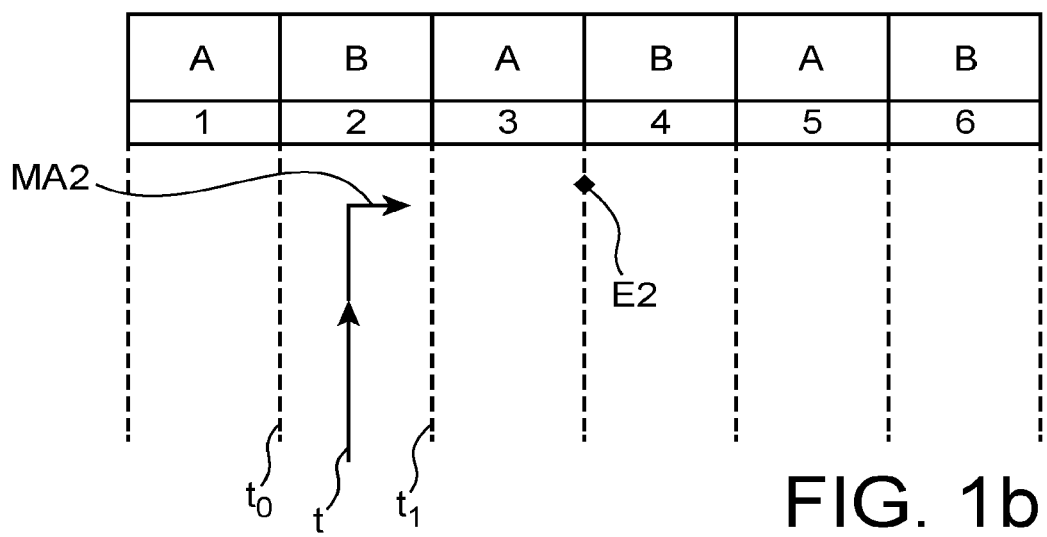
Figure 3:
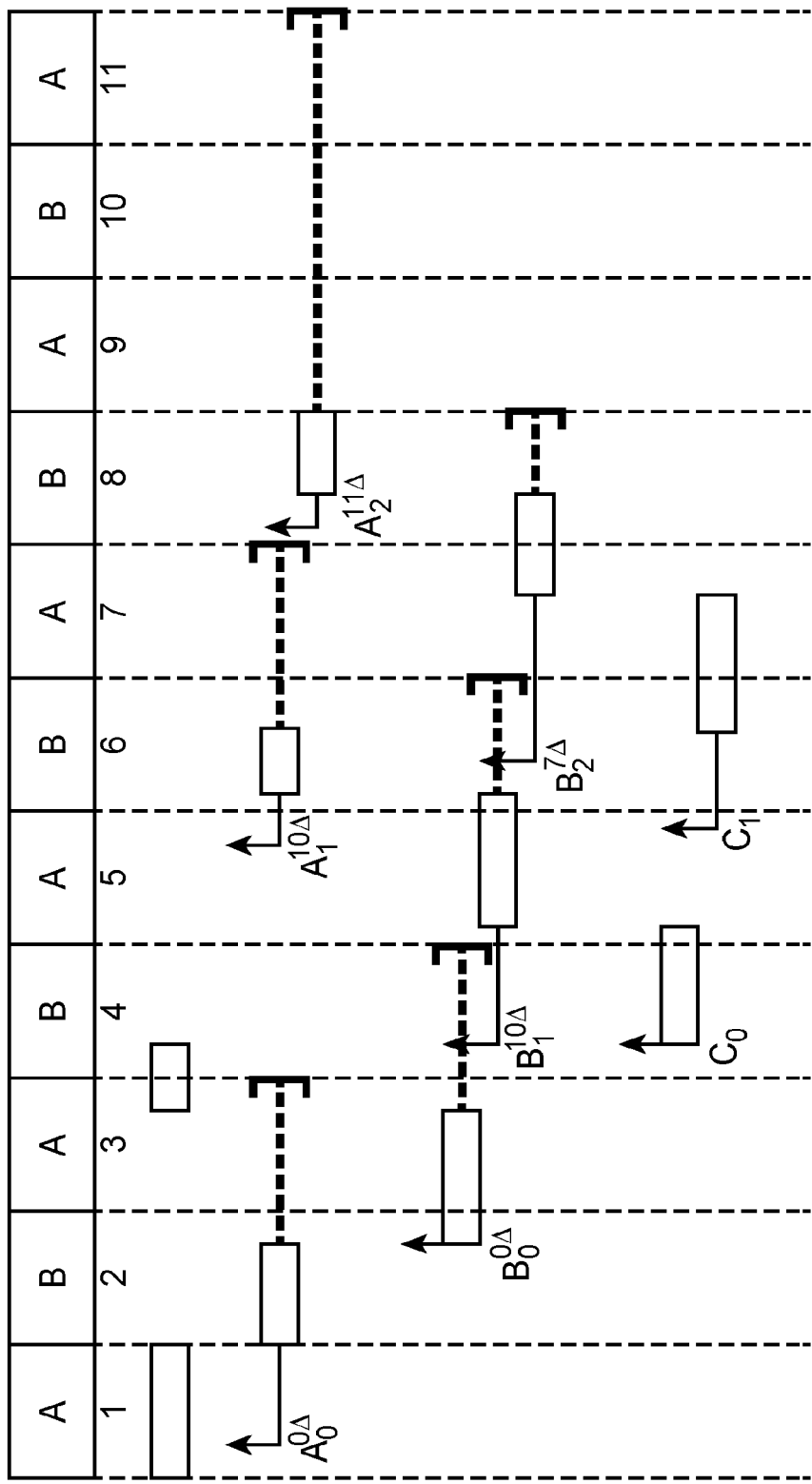
FIG. 3 is a timing chart representing an example of arbitration performed by the method according to the invention.

As with the TDMds arbitration described in the above-mentioned publication, the method according to the invention performs time-division multiple access whereby time is divided into time slots each allocated to a critical program for access to the shared resource, each time slot comprising a plurality of time units (a time unit is, for example, a clock cycle). An example of such a time division into slots with identical sizes alternately allocated to a first critical program A (the slots having an odd number) and to a second critical program B (the slots having an even number) is represented in FIGS. 1a, 1b and 3.

A critical program is for example a program subjected to time constraints for which it is desired to be able to bound the worst-case execution time (WCET). Thus, as for TDMds arbitration, the method according to the invention associates a processing deadline with each access request issued by a critical program. This deadline corresponds to the time instant at which processing the request of the critical program has to be terminated at the latest and has to be respected. The method also relates to access requests issued by programs that are not subjected to time constraints, that is, non-critical programs, and for which no notion of a processing deadline is necessary.

And the method according to the invention also utilises a processing slack associated with each critical program, this processing slack being used to possibly delay a processing deadline of an access request issued by the critical program, especially when the critical program has accumulated a sufficient processing slack. In this way, an access request to the resource issued by a program can be processed over a slot that is not allocated by construction to that program.

According to TDMds, arbitration decisions are made at the beginning of each time slot and are based only on the requests awaiting processing. It is then possible to delay a request of a critical program, depending on the processing deadline of that request. The processing slack is not utilised in arbitration decisions and only has an effect on calculating the processing deadlines of requests.

The invention is based on the recognition that a processing slack is also valid when a critical program has not (yet) issued an access request to the resource. In particular, it is possible to determine a lower bound for the processing deadline associated with any request issued by the critical program to which the next time slot is allocated (even when the program has not yet issued a request). The shared resource can then start processing any of the waiting requests if this lower bound is subsequent to the end of the next time slot. This guarantees that the memory can partially process the request in the current time slot, while completing this processing in the next time slot without violating the worst-case behaviour.

The invention thus provides to utilise the processing slacks, not at the beginning of each time slot, but at each time unit. The processing slack associated with the critical program to which the next time slot is allocated is looked up to determine whether a request can immediately be processed by the shared resource. The purpose of this look-up is to check whether an overflow of the processing time of the request on the next time slot does not question respect of the processing deadline associated with a possible request which would be issued by the critical program to which this next time slot is allocated.

Thus, within the scope of the invention, the processing slack of a critical program is updated at each termination of processing of an access request of the critical program to correspond to the number of time units between the termination of processing of the access request and the processing deadline of the access request. And the processing deadline of an access request of a critical program corresponds to the end of the time slot allocated to the critical program which is the first to begin after a date corresponding to an issue date of the access request delayed by adding the processing slack of the critical program.

FIGS. 1a and 1b represent an example where at a time unit corresponding to time t, access to the resource is released and it is checked whether a waiting request can be processed. This time unit t does not correspond to the beginning of the time slot allocated to the critical program B, which begins at $t_0$. The next time slot, allocated to the critical program A, begins at $t_1$.

In FIG. 1a, the processing slack MA1 of the critical program A to which the next time slot is allocated (slot #3) is sufficiently large to allow the processing deadline of a request that would be issued by program A between t and $t_1$ to be delayed. Instead of this deadline corresponding to the end I1 of the next time slot allocated to program A, it is delayed to correspond to the end E1 of time slot #5 allocated to program A, which follows a date corresponding to an issue date of the access request delayed by adding the processing slack of the critical program MA1. This amounts to determining that the processing slack MA1 is greater than the number of time units between t and $t_1$.

In FIG. 1b, the processing slack MA2 of the critical program A to which the next time slot is allocated is not large enough to allow the processing deadline of a request that would be issued by program A between t and $t_1$ to be delayed. Its processing deadline therefore corresponds to the end E2 of the next time slot (#3) associated with program A. This amounts to determining that the processing slack MA2 is less than the number of time units between t and $t_1$. In such a case, the waiting request cannot be processed because its processing could overflow into the next time slot #3, preventing processing a request that the critical program A would make and thus compromising respect of the processing deadline of the critical program A.

Figure 2:
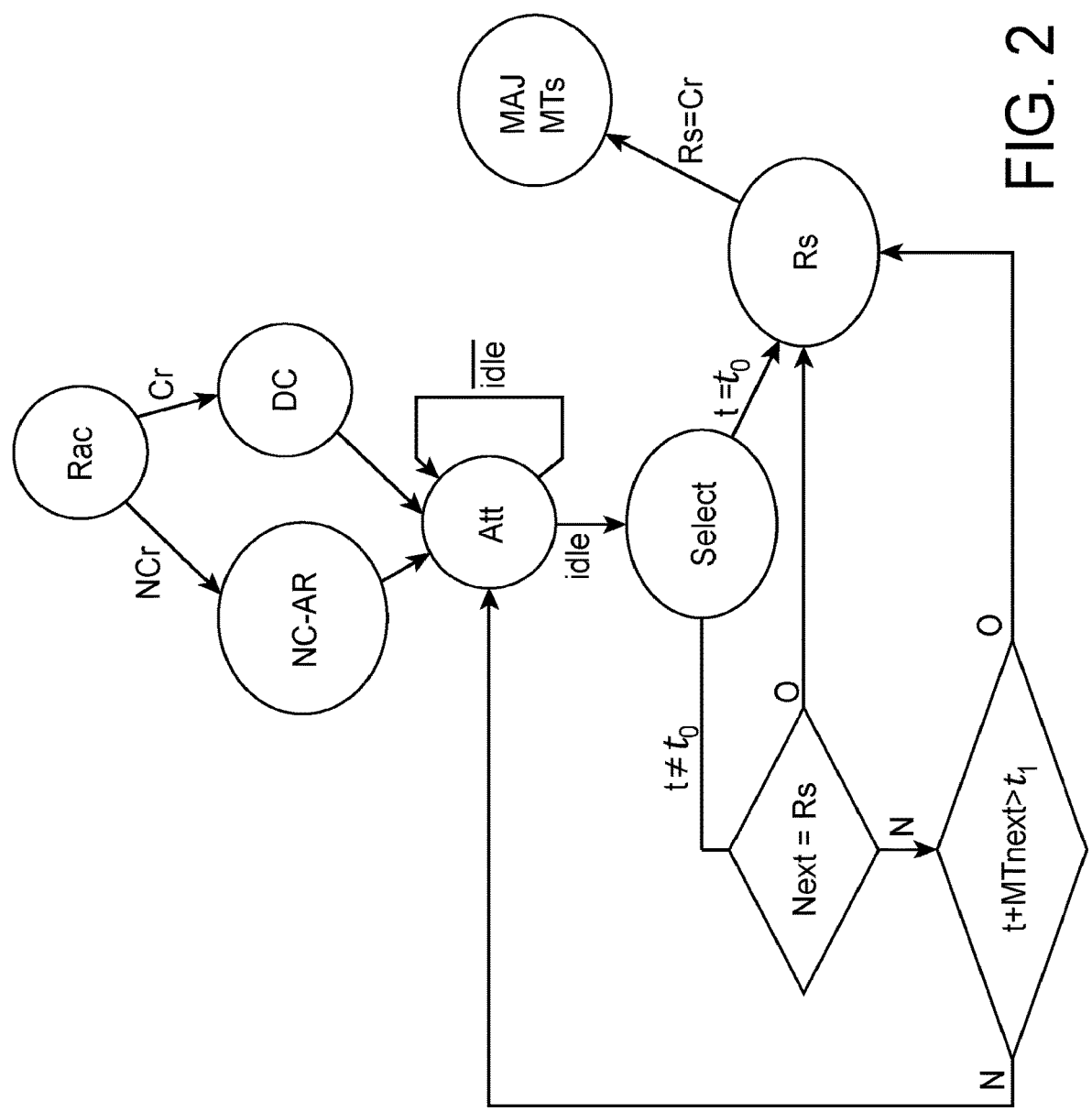
FIG. 2 is a state machine representing a sequence of steps of the method according to the invention.

FIG. 2 represents a state machine representative of an embodiment of the method according to the invention. In this figure, the reference "Rac" refers to issuing an access request to the shared resource.

If this issuing is performed by a critical program "Cr", calculating the processing deadline of the request issued by the critical program is performed during an operation "DC". This calculation utilises the processing slack accumulated by the critical program upon processing its previous access request to the resource to possibly delay the processing deadline beyond the end of the next time slot allocated to this critical program (i.e., at the end of a time slot allocated to the critical program subsequent to the next time slot allocated to the critical program).

If this issuing is performed by a non-critical program "NCr" and there are one or more other pending non-critical requests, an "NC-AR" arbitration of the non-critical requests is performed according to any arbitration policy (for example, fixed priority or first-come, first-served) to select one of them.

At each time unit, it is checked whether memory access is possible. If not (idle), pending requests are put in a wait state. If yes (idle), selecting (Select) a request and determining an authorisation for immediate processing of the selected access request are performed.

Selecting comprises choosing the request having the closest processing deadline from the requests of critical programs. The result of the selection is therefore either the critical request having the closest processing deadline or the non-critical request resulting from the "NC-AR" arbitration. For example, in the presence of a waiting access request of a critical program and a waiting access request of a non-critical program, selecting the access request of the non-critical program is performed if the processing deadline of the critical program is subsequent to the end date of the next time slot.

Determining an authorisation for immediate processing of the selected access request comprises, for a time unit not corresponding to the beginning of a time slot ($t \neq t_0$), when the critical program to which the next time slot is allocated has not issued the selected request ("Next=Rs" and "N"), authorising immediate processing of the selected request ("RS") if the processing slack of the critical program to which the next time slot is allocated is greater than a threshold ("t+MTnext>$t_1$" and "O"). If the processing slack is less than the threshold, the selected request is put in a wait state ("Att"). The threshold may correspond, as has been seen previously, to the time difference between the time unit t at which the determination step is performed and the time unit $t_1$ corresponding to the beginning of the next time slot. Alternatively, the threshold may correspond to the size of a time slot.

Determining an authorisation for immediate processing of the selected access request further comprises, for a time unit not corresponding to the beginning of a time slot ($t \neq t_0$), when the critical program to which the next time slot is allocated has issued the selected request ("Next=Rs" and "O"), authorising immediate processing of the selected request ("Rs").

And determining an authorisation for immediate processing of the selected access request further comprises, for a time unit corresponding to the beginning of a time slot ($t=t_0$), authorising immediate processing of the selected request ("Rs"). Once the selected request has been processed, if this request comes from a critical program ("Rs=Cr"), updating "MAJ MTs" the processing slack of this critical program is performed. In this way, the processing slack of a critical program is updated at each termination of processing of an access request of the critical program to correspond to the number of time units between the termination of processing of the access request and the processing deadline of the access request.

An example of the implementation of this method with two critical programs A and B, a non-critical program c and slots having a size of 8 time units is represented in FIG. 3. In this figure, the current value of the processing slack is indicated as a superscript of each request (for example, request $A_1$ of the critical program A has a processing slack of 10Δ, that is, 10 time units).

A first access request $A_0$ of the critical program A is first issued during slot #1 allocated to program A. The processing slack of A is zero and its processing deadline is set at the end of the next slot allocated to A (slot #3). At this point, the processing slack of B (owner of the next slot #2) is zero and it is not possible to perform an immediate processing of $A_0$ before the beginning of the next slot #2. Processing $A_0$ lasts six time units, and A has therefore accumulated a processing slack of 10 time units.

A first access request $B_0$ of the critical program B is issued during slot #2. The next slot #3 is allocated to program A, which has accumulated sufficient processing slack to authorise immediate processing of the request $B_0$ without the risk that overflowing of the processing of $B_0$ into slot #3 will question respect of the processing deadline associated with a possible request issued by the critical program A to which slot #3 is allocated. The processing slack of program B changes to 10 time units.

During slot #4, a first access request $c_0$ of the non-critical program c and a second access request $B_1$ of the critical program B are simultaneously issued. The request $c_0$ of the non-critical program is selected because the critical program B is not owner of the next slot #5, and is immediately processed because the critical program A that is owner of the next slot #5 has accumulated sufficient processing slack (in this case 10 time units). Then, as soon as the access request $c_0$ is terminated during slot #5, immediate processing of the request $B_1$ is performed because program B is owner of the next slot #6.

Upon processing request $B_1$, a second access request $A_1$ of the critical program A and a second access request $c_1$ of the non-critical program c are issued. When the processing of request $B_1$ is terminated during slot #6, the processing slack of program B changes to 7 time units. Request $A_1$ is selected and immediately processed because program A is owner of the next slot #7. Processing request $A_1$ terminates during slot #6, and the processing slack of program A changes to 11 time units.

When processing the request A1 is terminated, two requests are competing: the second access request $c_1$ of the non-critical program c and a third access request $B_2$ of the critical program B. The second access request $c_1$ is selected because the processing deadline of request $B_2$ is subsequent to the end of slot #7, then immediately processed because the processing slack of program A, that is owner of the next slot #7, is sufficient. When processing the request $c_1$ is terminated, request $B_2$ is immediately processed because program B is owner of the next slot #8. When processing the request $B_2$ is terminated during slot #8, its processing slack changes to 5 time units. A third access request $A_2$ of the critical program A is then issued, which, in view of the processing slack available to program A, has a processing deadline at the end of slot #11. Nevertheless, program A is owner of the next slot #9 and its request $A_2$ can be immediately processed.

FIG. 4 represents a possible implementation of a time-division multiplexing circuit CMT configured to implement the method according to the invention. The CMT circuit is interposed between cores C0, C1, Cm each executing a program and a shared resource. A processing slack is associated with each core executing a critical program. A counter can be implemented in the form of a register storing a number of time units not used by the core. This counter is part of the execution context of the critical program, and its value is therefore saved/reset at each pre-emption/resumption of the program execution.

The CMT circuit comprises an arbitration unit AR and a multiplexer MUX controlled by the arbitration unit to perform selective access by one of the cores to the shared resource. The CMT circuit additionally comprises a processing deadline calculation unit DC0, DC1, DCm associated with each of the cores. This unit is configured to receive an access request R0, R1, Rm issued by a program executed on the core with which it is associated and to calculate the processing deadline of the request when it is issued by a critical program. The DC0, DC1, DCm unit can comprise dedicated registers for storing the calculated deadline and the current processing slack.

If the request is issued by a non-critical program, the unit DC0, DC1, DCm simply passes the request to a unit NC.AR in charge of performing an arbitration between non-critical requests according to any arbitration policy. It can store a predefined value in the register dedicated to the deadline, for example the maximum value that can be taken by a deadline.

The arbitration circuit CA additionally comprises a unit Min.extractor configured to receive, from the processing deadline calculation units DC0, DC1, DCm, the value stored in their deadline-dedicated register, determine which is the smallest value and provide the arbitration unit AR with an identifier of the request having the closest deadline with respect to the current time instant.

The arbitration circuit CA also comprises a unit SL configured to receive, from the processing deadline calculation units DC0, DC1, DCm, the value stored in their slack-dedicated register and provide the arbitration unit AR with the processing slack corresponding to the critical program to which the next time slot is allocated.

At each time unit, if a waiting request can be processed, the arbitration unit AR selects a request (from the unit Min.extractor or the unit NC.AR) and checks whether it can be immediately processed. To do so, if the time unit corresponds to the beginning of a time slot, the request is processed. Otherwise, the arbitration unit determines whether processing of the request can overflow into the next time slot. As has been previously seen, such an overflow into the next time slot is authorised if either of the following two conditions is fulfilled:

The next slot is allocated to the program that issued the selected request;

The program to which the next slot is allocated has accumulated sufficient slack to allow an overflow of the selected request into its slot. By way of example, a sufficient slack corresponds to the size of a slot.

When processing a request issued by a critical program is terminated, the arbitration unit AR notifies the processing deadline calculation units DC0, DC1, DCm via a link Ack, which triggers updating the calculation of the time slack associated with the critical program the request of which has just been processed.

In one possible embodiment of the invention, the cores can perform pre-emptive multitasking, that is, distribute processor time between different programs. A program executing on one of the cores can thus be pre-empted for the benefit of another program. The program being executed is then interrupted to allow the other program to execute.

Yet, a time slot is actually associated with each core. This slot is allocated to it when the core executes a critical program. On the other hand, when the core executes a non-critical program, the slot can be utilised to process other requests from other cores. In the case when a critical program desires to pre-empt a non-critical program (according to the pre-emptive multitasking scheduling) and that non-critical program is awaiting processing of an access request to the shared resource, that request should be processed in order for the non-critical program to be effectively pre-empted.

Within the scope of this embodiment, in order to bound the waiting time for processing the non-critical request, it inherits the criticality of the critical program. The core then becomes critical and the time slot associated therewith is again dedicated to processing the request. Calculating the deadline is therefore based on the next occurrence of the time slot that is again dedicated to it. In a possible alternative, the current value of the processing slack of the critical program pre-empting the non-critical program can be added to determine this deadline.

It is also possible that a critical program pre-empts another critical program having a request awaiting processing due to a processing slack allowing other requests to be processed. A similar calculation can then be performed in order to reduce the waiting time before the pre-emption is performed.

The method according to the invention may thus comprise a step of pre-empting, for the benefit of a critical program, a first program that issued an access request to the shared resource awaiting processing. This pre-emption step comprises calculating, possibly taking the processing slack of the critical program into account, a processing deadline of said request corresponding to the end of a time slot allocated to the critical program.

The time-division multiplexing circuit CMT can perform such a pre-emption management in the following way. The core performing the pre-emption notifies the deadline computing unit associated therewith. If a non-critical program A is pre-empted for the benefit of a critical program B, the presence of a request from the non-critical program A in the unit NC.AR is checked. If such a request exists, then it is removed from the unit NC.AR and is considered critical in the further steps of the method previously described, potentially considering the processing slack of the critical program B for calculating the processing deadline now associated with program A. If a critical program A is pre-empted for the benefit of a critical program B, similarly, the processing slack of the critical program B can be used for calculating the new processing deadline of program A.

The invention is not limited to the method previously described but also extends to a time-division multiplexing circuit for concurrent access to a shared resource required by computer programs, configured to implement the method, and especially to the CMT circuit previously described.

The invention claimed is:

1. A computer-implemented method for arbitrating between computer programs attempting to concurrently access a shared resource (MM) by each issuing an access request, the method performing time-division multiple access whereby time is divided into time slots each allocated to a critical program for access to the shared resource, each time slot comprising a plurality of time units,
   in which method a processing slack (MA1, MA2) is associated with each critical program for delaying a processing deadline (I1) of an access request issued by the critical program,
   which method is characterised in that it comprises, at each time unit, a step of selecting an access request ($B_0$, $c_0$, $c_1$) from one or more waiting access requests and a step of determining an authorisation for immediate processing of the access request selected, said determination step comprising, for a time unit not corresponding to the beginning of a time slot, when the critical program (A) to which the next time slot is allocated has not issued the selected request, authorising immediate processing of the selected request ($B_0$, $c_0$, $c_1$) if the processing slack of the critical program to which the next time slot is allocated is greater than a threshold.

2. The method according to claim 1, wherein the determination step comprises, for a time unit not corresponding to the beginning of a time slot, when the critical program to which the next time slot is allocated (B) has not issued the selected request ($A_0$) and when the processing slack of the critical program to which the next time slot is allocated is less than the threshold, putting the request selected in a wait state.

3. The method according to claim 1, wherein the threshold corresponds to the time difference between the time unit at which the determination step is performed and the time unit corresponding to the beginning of the next time slot.

4. The method according to claim 1, wherein said determination step comprises for a time unit not corresponding to the beginning of a time slot, when the critical program (A) to which the next time slot is allocated has issued the selected request, authorising immediate processing of the request ($A_1$) selected.

5. The method according to claim 1, wherein said determination step comprises, for a time unit corresponding to the beginning of a time slot, authorising immediate processing of the request ($A_0$) selected.

6. The method according to claim 1, wherein the selection step comprises, in the presence of a waiting access request ($B_1$) of a critical program and a waiting access request ($c_0$) of a non-critical program, selecting the access request of the non-critical program ($c_0$) if the processing deadline of the access request ($B_1$) of the critical program is subsequent to the end of the next time slot.

7. The method according to claim 1, wherein the processing slack of a critical program is updated at each termination of processing of an access request of the critical program to correspond to the number of time units separating the termination of processing of the access request and the processing deadline of the access request.

8. The method according to claim 1, further comprising pre-empting, for the benefit of a critical program, a first program that issued an access request to the shared resource awaiting processing, said pre-emption comprising calculating a processing deadline of said request corresponding to the end of a time slot allocated to the critical program.

9. A time-division multiplexing circuit (CMT) for concurrent access to a shared resource required by computer programs, characterised in that it is configured to implement the method according to claim 1.

10. The method according to claim 7, wherein the processing deadline of an access request of a critical program corresponds to the end of a time slot allocated to the critical program that is the first to begin after a date corresponding to an issue date of the access request delayed by adding the processing slack of the critical program.

* * * * *